US010299290B2

(12) United States Patent
Amel et al.

(10) Patent No.: US 10,299,290 B2
(45) Date of Patent: May 21, 2019

(54) APPARATUS, SYSTEM AND METHOD OF RADAR DETECTION

(71) Applicant: INTEL IP CORPORATION, Santa Clara, CA (US)

(72) Inventors: Roy Amel, Haifa (IL); Noam Ginsburg, Portland, OR (US); Ofer Benjamin, Petach-Tikva (IL); Shahar Gross, Nes-Tziona (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/281,111

(22) Filed: Sep. 30, 2016

(65) Prior Publication Data

US 2018/0098351 A1 Apr. 5, 2018

(51) Int. Cl.
*H04B 1/00* (2006.01)
*H04B 15/00* (2006.01)
(Continued)

(52) U.S. Cl.
CPC ........... *H04W 74/008* (2013.01); *G01S 7/021* (2013.01); *H04B 1/0053* (2013.01); *H04K 3/822* (2013.01);
(Continued)

(58) Field of Classification Search
CPC ..... H04W 16/14; H04W 16/16; H04W 24/02; H04W 48/16; H04W 52/0238;
(Continued)

(56) References Cited

U.S. PATENT DOCUMENTS 4,268,915 A * 5/1981 Parmet ................... G04G 21/04
368/10
4,654,884 A * 3/1987 Sakai ................... H03G 3/3052
455/183.2

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Nguyen T Vo
*Assistant Examiner* — Rui M Hu
(74) *Attorney, Agent, or Firm* — Shichur & Co.

(57) ABSTRACT

Some demonstrative embodiments include apparatuses, devices, systems and methods of radar detection. For example, an apparatus may include a first detector component to detect energy over a wireless communication channel; a second detector component to detect a signal over the wireless communication channel, and to determine at least a classification of the signal as a radar-type or a non-radar type; a storage component to store radar detection information corresponding to signals detected by the second detector component, the radar detection information including at least the classification of the signal and one or more characteristics of the signal; and a controller to activate the second detector component upon detection of the energy by the first detector component, the controller configured to cause a radar-detection analysis of the radar detection information corresponding to a predefined time period.

22 Claims, 5 Drawing Sheets

(51) Int. Cl.
*H04W 74/00* (2009.01)
*G01S 7/02* (2006.01)
*H04K 3/00* (2006.01)
*H04W 88/06* (2009.01)

(52) U.S. Cl.
CPC ......... *H04K 3/226* (2013.01); *H04K 2203/16* (2013.01); *H04K 2203/18* (2013.01); *H04W 88/06* (2013.01)

(58) Field of Classification Search
CPC ....... H04K 3/22–3/228; H04K 2203/18; G01S 7/021–7/023
USPC ......... 455/63.1–65, 574, 343.2, 67.11, 226.2
See application file for complete search history.

(56) References Cited

U.S. PATENT DOCUMENTS

| | | | | |
|---|---|---|---|---|
| 5,790,946 | A * | 8/1998 | Rotzoll | H04W 52/0229 455/343.1 |
| 7,116,943 | B2 * | 10/2006 | Sugar | H04L 1/1664 455/67.11 |
| 7,129,884 | B1 * | 10/2006 | Tehrani | G01S 7/021 342/20 |
| 7,155,230 | B2 * | 12/2006 | Tsien | G01S 7/021 455/450 |
| 7,472,027 | B1 * | 12/2008 | Batcher | H04B 1/715 702/60 |
| 7,647,061 | B1 * | 1/2010 | Steer | H04W 24/00 455/446 |
| 7,907,080 | B1 * | 3/2011 | Zhang | G01S 7/021 342/196 |
| 8,179,825 | B2 * | 5/2012 | Steer | G01S 7/021 342/57 |
| 8,190,162 | B2 * | 5/2012 | Hansen | H04B 15/02 342/131 |
| 8,219,034 | B2 * | 7/2012 | Belcea | G01S 7/021 342/14 |
| 8,867,667 | B2 * | 10/2014 | Taghavi Nasrabadi | H04W 88/06 375/316 |
| 8,892,177 | B2 * | 11/2014 | Behzad | H04W 52/0229 455/574 |
| 8,897,343 | B2 * | 11/2014 | Gauthier | H04B 7/0811 375/219 |
| 9,304,189 | B2 * | 4/2016 | Rezk | G01S 7/021 |
| 9,622,161 | B1 * | 4/2017 | Law | H04W 48/16 |
| 9,635,649 | B1 * | 4/2017 | Amiri | H04W 72/0406 |
| 2005/0079849 | A1 * | 4/2005 | Na | H04B 1/005 455/323 |
| 2006/0028376 | A1 | 2/2006 | Theobold et al. | |
| 2006/0058035 | A1 * | 3/2006 | Tsuruno | H04B 17/382 455/454 |
| 2007/0082715 | A1 * | 4/2007 | Rofougaran | H04W 48/08 455/574 |
| 2007/0082716 | A1 * | 4/2007 | Behzad | H04W 52/0225 455/574 |
| 2007/0281638 | A1 * | 12/2007 | Hansen | G01S 7/021 455/127.4 |
| 2008/0075038 | A1 * | 3/2008 | Jin | H04W 16/14 370/329 |
| 2010/0194623 | A1 * | 8/2010 | Hansen | G01S 7/021 342/52 |
| 2012/0083218 | A1 * | 4/2012 | Gossain | H04B 17/23 455/67.11 |
| 2013/0072256 | A1 * | 3/2013 | Su | H04W 52/0274 455/558 |
| 2016/0077134 | A1 * | 3/2016 | Rezk | H04K 3/00 324/76.39 |
| 2017/0052248 | A1 * | 2/2017 | Rezk | H04B 1/123 |
| 2017/0094651 | A1 * | 3/2017 | Green | H04W 72/048 |
| 2017/0118698 | A1 * | 4/2017 | Law | H04W 48/16 |
| 2017/0150368 | A1 * | 5/2017 | Ngo | H04K 3/00 |
| 2017/0181015 | A1 * | 6/2017 | Ngo | H04W 16/14 |

OTHER PUBLICATIONS

International Search Report and Written Opinion for PCT/US2017/049236, dated Nov. 24, 2017, 11 pages.

* cited by examiner

APPARATUS, SYSTEM AND METHOD OF RADAR DETECTION

TECHNICAL FIELD

Embodiments described herein generally relate to radar detection.

BACKGROUND

Some communication technologies, for example, Wi-Fi, cellular the like may share one or more restricted communication bands, e.g., including the 5 Gigahertz (GHz) unlicensed wireless communication band, with radar transmissions.

For example, one regulator requirement for communicating over the 5 GHz band, allows transmitting over the 5 GHz band only if there is no radar detection during a predefined time period before the transmission over the 5 GHz band.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
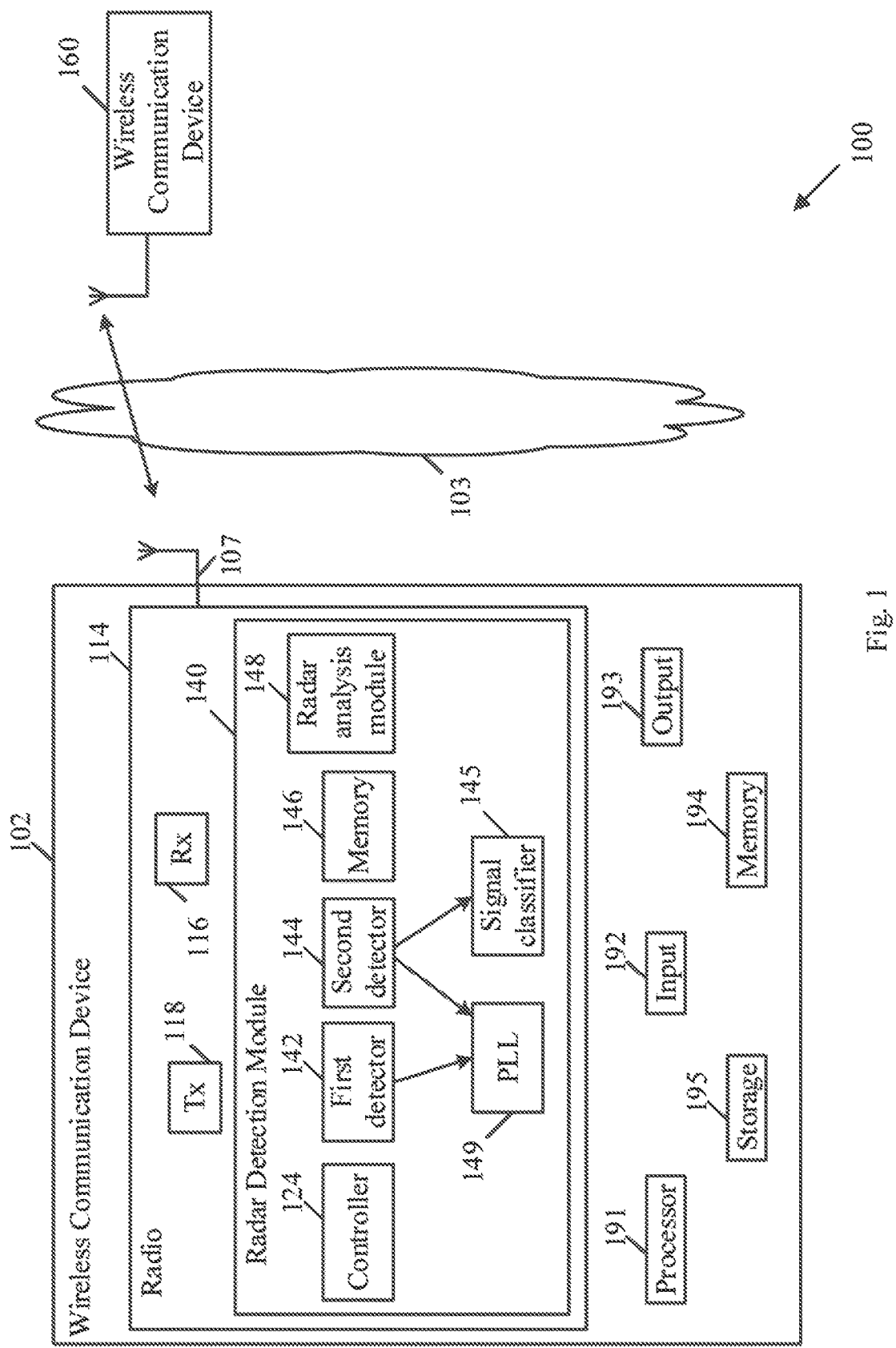
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a cellular network, a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/D6.0, June 2016 draft standard for Information technology—Telecommunications and information exchange between systems Local and metropolitan area networks Specific requirements; Part 11: Wireless LAN Medium Access Control (MAC) and Physical Layer (PHY) Specification")*; IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*); and/or IEEE 802.11az (*IEEE 802.11az, Next Generation Positioning*)) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April* 2011, *Final specification*) and/or future versions and/or derivatives thereof, devices and/or networks operating in accordance with existing WiFi Alliance (WFA) Peer-to-Peer (P2P) specifications (including *WiFi P2P technical specification, version* 1.5, *Aug.* 4, 2014; *and/or Wi-Fi Neighbor Awareness Networking (NAN) Technical Specification, Version* 1.0, May 1, 2015) *and/or future versions and/or derivatives thereof, devices and/or networks operating in accordance with existing cellular specifications and/or protocols, e.g.,* 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 5 Gigahertz (GHz). However, other embodiments may be implemented utilizing any other suitable wireless communication frequency bands, for example, a 2.4 GHz frequency band, a 60 GHz band, a millimeterWave (mmWave) frequency band, a Sub 1 GHz (S1G) frequency band, a WLAN frequency band, a cellular frequency band, an LTE frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102 and/or a wireless communication device 160.

In some demonstrative embodiments, device 102 may include a mobile or a portable device.

In some demonstrative embodiments, device 102 may include, for example, a UE, an MD, a STA, an AP, a mobile computer, a laptop computer, an Ultrabook™ computer, a notebook computer, a tablet computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a video source, an audio source, a video sink, an audio sink, a stereo tuner, a broadcast radio receiver, a Personal Media Player (PMP), a digital video camera (DVC), a digital audio player, a gaming device, a data source, a data sink, a Digital Still camera (DSC), a media player, a Smartphone, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In one example, a station (STA) may include a logical entity that is a singly addressable instance of a medium access control (MAC) and physical layer (PHY) interface to the wireless medium (WM). The STA may perform any other additional or alternative functionality.

In one example, an AP STA may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In other embodiments, device 102 may operate as, perform a role of, and/or perform one or more functionalities of, any other additional or alternative device and/or station.

In some demonstrative embodiments, wireless communication device 102 may be capable of communicating content, data, information and/or signals via a wireless medium (WM) 103, for example, with device 160. In some demonstrative embodiments, wireless medium 103 may include, for example, a radio channel, a WLAN channel, a cellular channel, an RF channel, a WiFi channel, an LTE channel, an IR channel, a Bluetooth (BT) channel, a Global Navigation Satellite System (GNSS) Channel, and the like.

In some demonstrative embodiments, device 102 may include one or more radios including circuitry and/or logic to perform wireless communication between devices 102 and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receivers 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over one or more wireless communication frequency bands, for example, including a 2.4 GHz band, a 5 GHz band, a directional band, for example, an mmWave band, a S1G band, and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, Antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, Antennas 107 may include a phased array antenna, a multiple element antenna, a set of switched beam antennas, and/or the like. In some embodiments, Antennas 107 may implement transmit and receive functionalities using separate transmit and receive antenna elements. In some embodiments, Antennas 107 may implement transmit and receive functionalities using common and/or integrated transmit/receive elements.

In one example, device 102 may include a single antenna 107. In another example, device 102 may include two or more antennas 107.

In some demonstrative embodiments, transmitter 116 may be configured to transmit over a wireless communication frequency band, which may be subject to one or more restrictions, for example, regulatory restrictions, e.g., as described below.

In one example, the wireless communication channel may include an RF channel, a WiFi channel, a cellular channel, an LTE channel, and/or any other channel for wireless communication according to any additional or alternative wireless communication technology and/or Radio Access Technology (RAT).

In some demonstrative embodiments, transmitter 116 may be configured to transmit over a wireless communication channel in the wireless communication frequency band.

In some demonstrative embodiments, the wireless communication frequency band may be shared for communications of Radar signals.

In some demonstrative embodiments, the wireless communication channel may include a Dynamic Frequency Selection (DFS) channel.

In some demonstrative embodiments, the wireless communication frequency band may be subject to regulations for coexistence with Radar signals, and/or any other regulations and or restrictions corresponding to radar communications and/or any other additional or alternative type of signals and/or communications.

In some demonstrative embodiments, the wireless communication frequency band may include the 5 Ghz frequency band.

In some demonstrative embodiments, the wireless communication channel may include a channel in the 5 GHz unlicensed frequency band.

In some demonstrative embodiments, the wireless communication frequency band may include any other additional or alternative frequency band, which may be shared with Radar signals.

In some demonstrative embodiments, transmission over the DFS channel may be allowed, for example, according to one or more regulations, for example, only if the transmission does not cause interference to the radar signals.

In some demonstrative embodiments, transmissions over the DFS channel may be allowed only if radar signals are not present over the DFS channel, e.g., as described below.

In some demonstrative embodiments, device 102 may be allowed to transmit over the DFS channel, for example, only if device 102 performs and passes one or more tests before device 102 transmits over the DFS channel.

In some demonstrative embodiments, some regulations for transmitting over a DFS channel may define two types of entities, e.g., a master device and a slave device. For example, according to the regulations the master device must have detection capabilities of radar signals, and the slave device may not be required to have the radar detection capabilities.

For example, a regulatory requirement may include a requirement for the master device to perform a Channel Availability Check (CAC), for example, before a transmission over the DFS channel.

For example, a regulatory requirement may define a predefined CAC period, e.g., of at least one minute, during which a device may be required to listen over the DFS channel, for example, to decide whether or not radar signals are present over the DFS channel.

For example, the master device may be allowed to transmit over the DFS channel, for example, only if radar signals are not detected over the DFS channel during the predefined CAC period prior to the transmission attempt.

In some use cases, scenarios and/or deployments, a mobile device may be configured as a slave device, which may not be required to have radar detection capabilities.

In some demonstrative embodiments, a mobile device may not be able to benefit from transmitting over the DFS band, e.g., in some scenarios, for example, if the mobile device is configured as a slave device.

In some demonstrative embodiments, it may not be effective or possible to configure the mobile device to have full capabilities of a master device, for example, to comply with the regulatory requirements of the master device.

In one example, if a mobile device is configured to comply with the regulatory requirements of a master device, in case a user of the mobile device wishes to transmit over a DFS channel in the 5 GHZ band, the user may be required to wait for at least the CAC period, e.g., one minute, before a transition over the DFS channel, e.g., to make the decision whether or not radar signals are present over the DFS channel. This requirement may result in a poor user experience. One option of eliminating the waiting of the mobile device during the CAC period, would be to have the mobile device continuously perform radar detection, e.g., to enable the mobile device to have an available DFS channel at any time, e.g., without any delay. However, performing continuously performing radar detection may significantly increase power consumption of the mobile device and may impact a battery life of the mobile device. Accordingly, the option of continuously performing radar detection may be suitable for static devices, e.g. APs, having an Alternate Current (AC) power supply.

Some demonstrative embodiments may enable a mobile device, e.g., device 102, to transmit over a DFS channel, for example, even without requiring the mobile device to wait for the CAC period, for example, even without any delay, e.g., as described below.

In some demonstrative embodiments, device 102 may include a radar detection module 140, which may be configured to perform one or more operations of radar detection, e.g., even continuously, for example, to allow transmission over a DFS channel, for example, even without any delay, e.g., as described below.

In some demonstrative embodiments, radar detection module 140 may be configured to perform radar detection operations with reduced power consumption, e.g., as described below.

In some demonstrative embodiments, radar detection module 140 may be configured to operate with one or more components of device 102, for example, one or more clock components, which may be active or operative ("switched on"), for example, even during an idle or power save mode of device 102.

In some demonstrative embodiments, radar detection module 140 may utilize a receiver chain implementation, for example, implementing a dedicated, and/or ultra-low power optimized receiver chain, which may be configured to operate on a DFS channel, for example, even any DFS channel, for example, regardless of an operating state of device 102, e.g., even during idle or power save mode.

In some demonstrative embodiments, radar detection module 140 may include circuitry and/or logic, e.g., one or more components including circuitry and/or logic, which may be activated in a gradual manner, for example, to reduce or minimize a number of active components, e.g., as described below.

In some demonstrative embodiments, radar detection module 140 may be implemented as part of radio 114, for example, as part of Rx 116. In other embodiments, one or more components of radar detection module 140 may be implemented separately from radio 114, for example, as a separate component of device 102 and/or as part of one or more other components of device 102.

In some demonstrative embodiments, radar detection module 140 may include a controller 124 configured to control one or more operations and/or functionalities of radio detection module 140, for example, to allow determining whether or not device 102 is allowed to transmit over a wireless communication channel, e.g., the DFS channel, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In some demonstrative embodiments, at least part of the functionality of radar detection module 140 and/or radio 114 may be implemented by an integrated circuit, for example, a chip, e.g., a System on Chip (SoC). In one example, the chip or SoC may be configured to perform one or more functionalities of radar detection module 140 and/or radio 114. For example, the chip or SoC may include one or more elements of radar detection module 140, one or more elements of controller 124, and/or one or more elements of radio 114. In one example, radar detection module 140, controller 124, and radio 114 may be implemented as part of the chip or SoC.

In some demonstrative embodiments, radar detection module 140 may include a first detector component 142 including circuitry to detect energy, for example, Radio Frequency (RF) energy, e.g., RF energy above a predefined energy detection threshold, over a wireless communication channel, e.g., a DFS channel.

In one example, first detector component 142 may include a very low power receiver having a low bandwidth and a narrow dynamic range, for example, sufficient to detect energy presence, e.g., over the DFS channel.

In some demonstrative embodiments, radar detection module 140 may include a second detector component 144 including circuitry to detect a signal over the wireless communication channel, e.g., as described below.

In some demonstrative embodiments, controller 124 may be configured to selectively control activation of the second detector component 144, for example, based on energy detection by the first detector component 142, e.g., as described below.

In some demonstrative embodiments, the second detector component 144 may be configured to determine at least a classification of the signal as a signal, which may potentially be a radar signal ("radar-type"), or as a signal, which is not considered to be potentially a radar signal ("non-radar type").

In some demonstrative embodiments, the signal may be classified as radar type or non-radar type, for example, based on whether one or more attributes of the signal are similar to attributes of a radar signal, for example, a chirp signal, a sweep signal, or the like.

In some demonstrative embodiments, radar detection module 140 may include a signal classifier 145 configured to determine the classification of the signal, e.g., as the radar-type or the non-radar type.

In some demonstrative embodiments, the second detector component 144 may be configured to, based at least on a detected duration of the signal, activate signal classifier 145, for example, to determine the classification of the signal.

In some demonstrative embodiments, the second detector component 144 may have power consumption, e.g., greater than a power consumption of the first detector component 142.

In some demonstrative embodiments, the second detector component 144 may be activated, for example, if energy was detected, e.g., by the first detector component 142.

In some demonstrative embodiments, controller 124 may be configured to activate the second detector component 144, for example, upon detection of the energy by the first detector component 142.

In some demonstrative embodiments, the second detector component 144 may implement a bandwidth and/or a dynamic range, which may be sufficient, for example, to enable pulse detection and/or chirp detection, e.g., as described below.

In some demonstrative embodiments, the second detector component 144 may implement a bandwidth, which may be wider than the limited bandwidth of the first detector component 142, and/or a dynamic range, e.g., which may be wider than the dynamic range of the first detector component 142.

In some demonstrative embodiments, radar detection module 140 may include a memory component (also referred to as "storage component") 146, which may be configured to store radar detection information corresponding to signals detected by the second detector component 144, e.g., as described below.

In some demonstrative embodiments, the radar detection information may include at least the classification of the signal, e.g., as a radar-type or a non-radar type, and/or one or more characteristics of the signal, e.g., as described below.

In some demonstrative embodiments, the one or more characteristics of the signal may include for example, a duration of the signal, and/or a power of the signal.

In some demonstrative embodiments, the radar detection information stored by storage component 146 may include any other additional or alternative information relating to any other additional or alternative characteristics of the signal, and/or other additional or alternative information to be used by radar detection module 140.

In some demonstrative embodiments, storage component 146 may include a database (DB), for example, to store one or more outputs of one or more components of radar detection module 140, e.g., including the radar detection information.

In some demonstrative embodiments, storage component 146 may include, for example, a Random Access Memory (RAM), a flash memory, a volatile memory, a cache memory, a buffer, a short-term memory unit, a long-term memory unit, and/or any other additional or alternative memory units.

In some demonstrative embodiments, memory component 146 may be implemented as part of radar detection module 140, e.g., as shown in FIG. 1.

In some demonstrative embodiments, memory component 146 may be implemented as a separate element of device 102, or as part of any other element of device 102, e.g., as part of memory 194, or radio 114.

In some demonstrative embodiments, controller 124 may be configured to trigger a radar-detection analysis of the radar detection information stored in memory 146, e.g., as described below.

Some demonstrative embodiments, controller 124 may be configured to trigger a radar-detection analysis of the radar detection information stored in memory 146 corresponding to a predefined time period, e.g., prior to a transmission attempt of device 102, e.g., of Tx 118, over the wireless communication channel.

In some demonstrative embodiments, the predefined time period may include the CAC period.

In some demonstrative embodiments, the predefined time period may include a time period of one minute.

In other embodiments, the predefined time period may include any other time period.

In some demonstrative embodiments, radar detection module 140 may include a radar analysis module 148 configured to perform the radar-detection analysis of the radar detection information.

In some demonstrative embodiments, radar analysis module 148 may include, for example, logic, a software module, an application, and/or an algorithm implemented by software and/or hardware, and/or any other computing module.

In one example, radar analysis module 148 may include a Software algorithm configured to analyze a histogram of pulses, for example, based on the radar detection information stored in memory 146, for example, to determine whether the radar detection information corresponds to radar signals.

In one example, radar analysis module 148 may be able to detect, identify and/or confirm radar existence, e.g., over the wireless communication channel, for example, based on the analysis of the radar detection information stored in memory 146.

In some demonstrative embodiments, radar analysis module 148 may be implemented as part of radar detection module 140, e.g., as shown in FIG. 1. In other embodiments, radar analysis module 148 may be implemented as part of any other element of device 102, e.g., as part of radio 114, or by an application executed by device 102.

In some demonstrative embodiments, controller 124 may be configured to select whether or not to allow the transmission attempt, e.g., by Tx 118, over the wireless communication channel, for example, based on the radar-detection analysis.

In one example, controller 124 may retrieve, e.g., prior to a transmission attempt over the wireless communication channel, the radar detection information from memory 146, for example, including information corresponding to a predefined time period, for example, a CAC period, e.g., one minute or any other period, prior to the transmission attempt. For example, controller 124 may trigger radar analysis module 148 to analyze the retrieved radar detection information, for example, to determine, detect, identify and/or confirm presence of radar signals during the predefined time period prior to the transmission attempt. According to this example, controller 124 may allow the transmission attempt over the wireless communication channel, e.g., by allowing a transmission by Tx 118, for example, only if it is determined, e.g., according to the analysis of the retrieved radar detection information, that there were no radar signals present during the predefined period prior to the transmission attempt.

In some demonstrative embodiments, controller 124 may be configured to operate the first detector component 142 and the second detector component 144, for example, during at least a low power mode of device 102.

In one example, controller 124 may operate detector components 142 and/or 144 even during the low power mode of device 102, for example, to allow detection of radar signals, e.g., even at any time, for example, while utilizing a reduced power consumption of device 102.

In one example, controller 124 may operate detector components 142 and/or 144 continuously, e.g., regardless of a power mode of device 102.

In some demonstrative embodiments, controller 124 may be configured to trigger the radar-detection analysis, e.g., at an active power mode of the wireless station, for example, based on the retrieved radar detection information from, memory 146, which may have been collected, e.g., even during operation of device at the lower power mode.

In some demonstrative embodiments, radar detection module 140 may include a phase locked loop (PLL) 149, which may be shared by the first detector component 142 and the second detector component 144.

In one example, the PLL 149 may include a low power PLL having relatively loose noise requirements, e.g., sufficient to allow the energy detection by the first detector component 142 and/or sufficient to allow the signal classification and/or determining the characteristics of the detected signal by the second detector component 144.

In one example, PLL 149 may include digital timers, which may be shared by both the first detector component 142 and the second detector component 144.

In some demonstrative embodiments, controller 124 may be configured to change a frequency of the PLL 149, e.g., to support detection of energy by the first detector component 142, and to lock the frequency of the PLL 149, for example, upon detection of the energy by the first detector component 142.

In some demonstrative embodiments, first detector component 142 may be configured to allow energy detection over one or more frequencies, for example, in a coarse or non-accurate manner, which may allow reduced, e.g., minimal, power consumption.

In some demonstrative embodiments, first detector component 142 may include one or more components configured to support detecting energy of a sufficient level to indicate potential presence of a signal over the wireless communication channel, e.g., as described below.

In some demonstrative embodiments, first detector component 142 may include components, which may be sufficient, for example, to filter out energy from one or more frequencies, e.g., even in a non well filtered or non-accurate manner, for example, with reduced, e.g., minimal, power consumption.

In some demonstrative embodiments, the first detector component 142 may include one or more components, for example, including at least an In-phase only (I-only) mixer, an analog baseband filter, an envelope detector, an Analog to Digital Converter (ADC), and/or one or more digital power detectors.

In one example, the ADC may include a low rate ADC, e.g., beyond an envelope detector cut off, and/or the one or more digital power detectors may be configured for different pulse lengths.

In some demonstrative embodiments, the second detector component 144 may include one or more components configured to detect a pulse signal in the one or more frequencies, to classify the signal, e.g., as radar-type or non-radar type, and/or to determine one or more characteristics of the detected signal, for example, including the length/duration and/or power, e.g., as described above.

In some demonstrative embodiments, the second detector component 144 (also referred to as "Medium Power (MP) component") may have greater power consumption, e.g., compared to the reduced power consumption of the first detector component 142 (also referred to as "Low Power (LP) component").

In some demonstrative embodiments, second detector component 144 may include one or more components, for example, including at least an I-only mixer, an analog baseband filter, an Analog to Digital Converter (ADC), a digital filter, a plurality of digital power detectors, and pulse detector/classifier module, e.g., a chirp detector to implement a chirp detection algorithm.

In one example, the ADC may include a high rate ADC, the digital filter may include a tight digital filter, the plurality of digital power detectors may include three digital power detectors or any other number of power detectors.

In some demonstrative embodiments, the second detector component 144 may be configured to detect the signal over one or more frequencies, and to store in memory 146 one or more characteristic of the detected signal, e.g., including at least the duration of the signal, the power of the signal, and/or the classification of the signal.

In some demonstrative embodiments, controller 124 may be configured to selectively control activation and/or operation of the second detector component 144. For example, controller 124 may be configured to activate the second detector component 144, for example, only when first detector component 142 detects the energy over the wireless communication channel, and, for example, only for a limited time period.

In some demonstrative embodiments, controller 124 may be configured to change the frequency of PLL 145, e.g., at a predefined rate, and/or to lock PLL 145, for example, when the energy is detected over the wireless communication channel, e.g., as descried above.

In some demonstrative embodiments, controller 124 may be configured to determine when and for how long to activate or deactivate detector components 142 and/or 144, based on one or more criteria, for example, based on the detection of the energy, e.g., as described above.

In some demonstrative embodiments, controller 124 may be configured to determine when and for how long to activate or deactivate one or more components of detector component 144, for example, base don one or more criteria, e.g., as described above.

In some demonstrative embodiments, controller 124 may be configured to determine when to retrieve radar detection information from memory 146, which radar detection information to retrieve from memory 146, and/or when to trigger analysis of the radar detection information retrieved from memory 146, e.g., as described above.

In some demonstrative embodiments, controller 124 may be configured to determine whether or not to allow device, e.g., radio 114 and/or Tx 118, to remain over the wireless communication channel, or, for example, to trigger device 120 to move to another wireless communication channel, for example, based on a result of the analysis of the radar detection information retrieved from memory 146. For example, controller 124 may be configured to trigger device 102 to move to another wireless communication channel, for example, if a current wireless communication channel is detected to be very noisy and/or to have interference with radar signals.

In some demonstrative embodiments, controller 124 may be configured to disregard detected signals, which may be detected by detector components 142 and/or 144 over a wireless communication channel, for example, when radio 114 is already transmitting or receiving over the wireless communication channel.

In some demonstrative embodiments, controller 124 may be configured to determine and/or set a center frequency of a wireless communication channel over which detection is to be performed by detector components 142 and/or 144, and/or to determine and/or set a channel bandwidth, e.g., a channel bandwidth of 80 Mhz, 40 Mhz or 20 Mhz, or any other channel bandwidth, over which detection is to be performed by detector components 142 and/or 144.

In some demonstrative embodiments, the components and/or operation of radar detection module 140, e.g., as described above, may be configured to allow a mobile device, e.g., device 102, which is not powered by an AC power source, to perform radar detection for long periods of time, e.g., even continuously.

In some demonstrative embodiments, the components and/or operation of radar detection module 140, e.g., as described above, may enable 102 to differentiate, for example, between a basic power detection and a radar detection.

In some demonstrative embodiments, the components and/or operation of radar detection module 140, e.g., as described above, may enable device 102 to perform an offline analysis of radar detection information stored by memory 146, for example, to enable analysis of the radar detection information only when required, e.g., not all the time.

In some demonstrative embodiments, the components and/or operation of radar detection module 140, e.g., as described above, may enable operation of radar detection module 140, for example, even at an idle state of device 102, for example, with a minimal impact on a power consumption of device 102.

Figure 2:
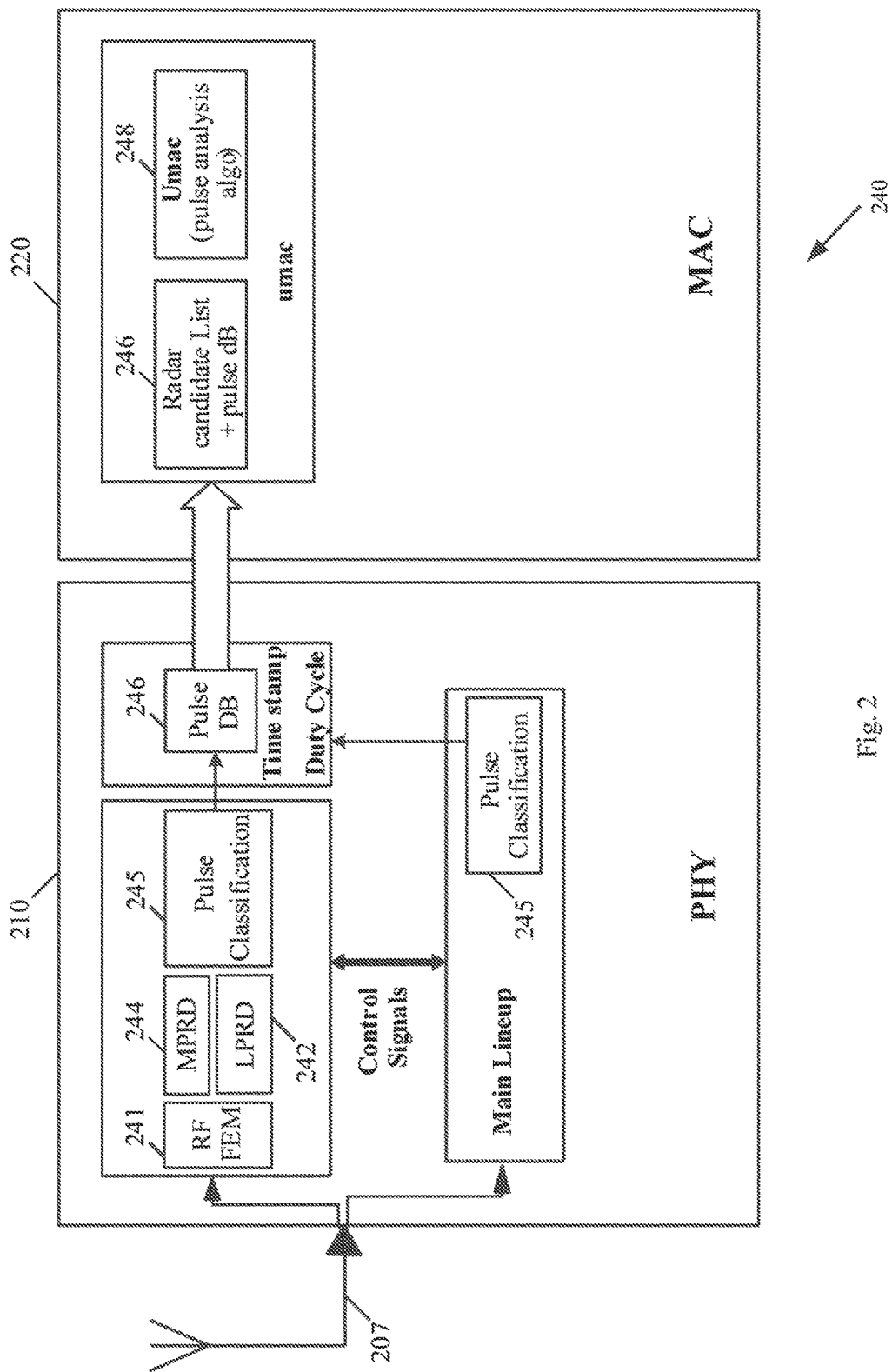
FIG. 2 is a schematic block diagram illustration of the architecture of a radar detection module, in accordance with some demonstrative embodiments.

Reference is made to FIG. 2, which schematically illustrates the architecture of a radar detection module 240, in accordance with some demonstrative embodiments. For example, radar detection module 240 may perform one or more operations and/or functionalities of radar detection module 140 (FIG. 1).

In some demonstrative embodiments, as shown in FIG. 2, components of radar detection module 240 may be implemented as part of a PHY component 210 and/or a MAC component 220.

In some demonstrative embodiments, as shown in FIG. 2, radar detection module 240 may be configured to detect signals and/or energy via at least one antenna 207, which may be connected to a Front End Module (FEM) to process signals from antenna 207.

In some demonstrative embodiments, as shown in FIG. 2, radar detection module 240 may include a Low Power Radar Detector (LPRD) 242 configured to detect energy over a wireless communication channel. For example, LPRD 242 may perform the functionality of detector component 142 (FIG. 1).

In some demonstrative embodiments, as shown in FIG. 2, radar detection module 240 may include a Main Power Radar Detector (MPRD) 244 configured to detect and classify a signal, e.g., as a radar type or a non-radar type. For example, MPRD 244 may perform the functionality of detector component 144 (FIG. 1).

In some demonstrative embodiments, as shown in FIG. 2, radar detection module 240 may include a pulse classifier 245 to classify the signal. For example, pulse classifier 245 may perform the functionality of signal classifier 145 (FIG. 1).

In some demonstrative embodiments, as shown in FIG. 2, radar detection module 240 may include one or more memory components 246 configured to store radar detection information, e.g., the characteristics of the signal and the classification of the signal. For example, memory components 246 may perform the functionality of memory component 146 (FIG. 1).

In some demonstrative embodiments, as shown in FIG. 2, radar detection module 240 may include a pulse analysis algorithm 248 configured to perform the radar-detection analysis of the radar detection information. For example, pulse analysis algorithm 248 may perform the functionality of radar analysis module 148 (FIG. 1).

Figure 3:
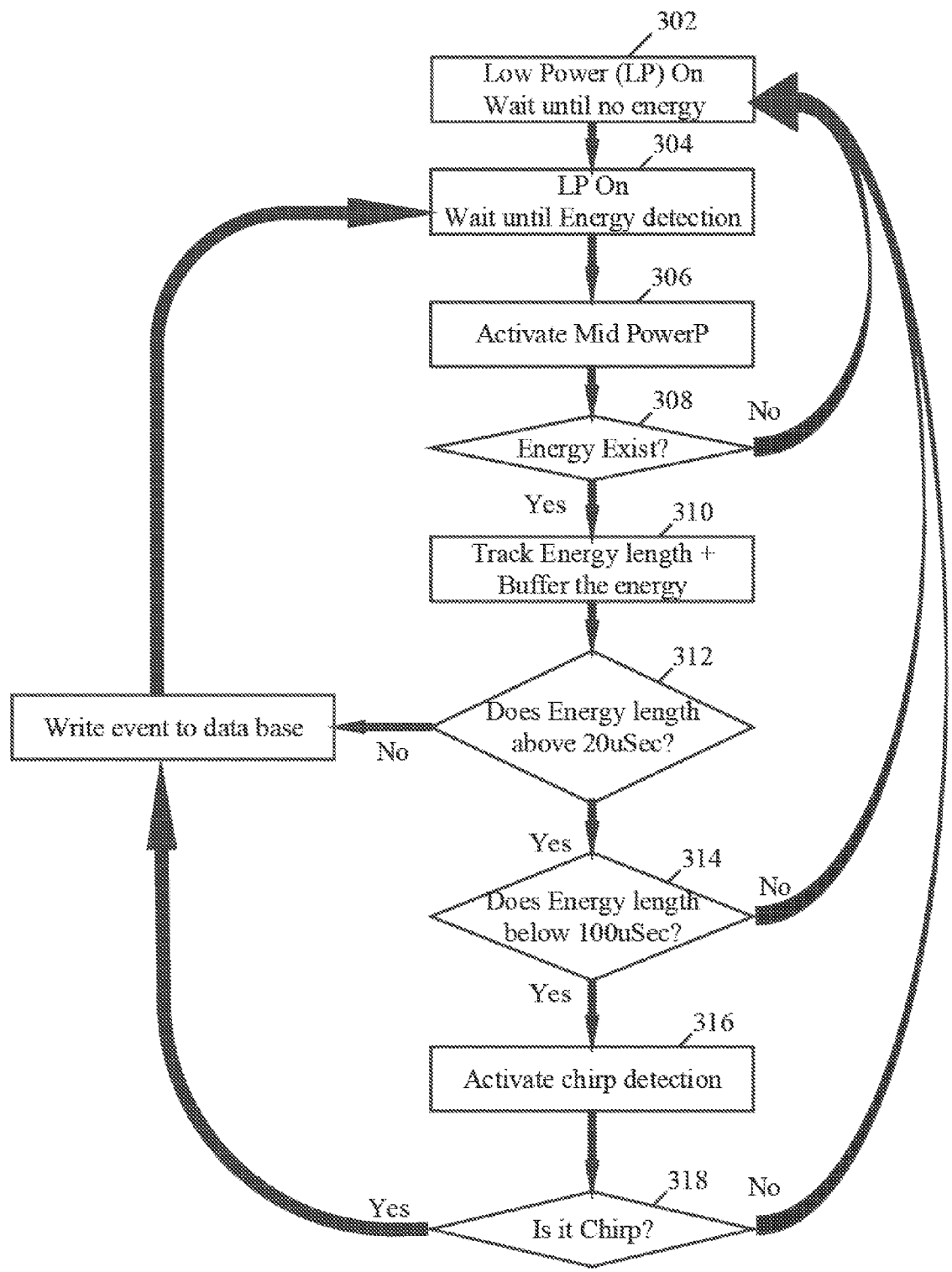
FIG. 3 is a schematic flow-chart illustration of a method of radar detection, in accordance with some demonstrative embodiments.

Reference is made to FIG. 3, which schematically illustrates a method of radar detection, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1); a radar detection module, e.g., radar detection module 140 (FIG. 1); a controller, e.g., controller 124 (FIG. 1); a detector component, e.g., detector components 142 and/or 144 (FIG. 1); and/or a radar analysis module, e.g., radar analysis module 148 (FIG. 1).

As indicated at block 302, the method may include operating a first detector component to wait over a wireless communication channel until no energy detection over the wireless communication channel. For example, controller 124 (FIG. 1) may operate detector component 142 (FIG. 1) to wait over the wireless communication channel until the wireless communication channel is not noisy.

As indicated at block 304, the method may include operating the first detector component to wait over the wireless communication channel to detect energy over the wireless communication channel, e.g., when the wireless communication channel is quiet. For example, controller 124 (FIG. 1) may operate detector component 142 (FIG. 1) to wait over the wireless communication channel to detect the energy, e.g., as described above.

As indicated at block 306, the method may include activating a second detector component, e.g., if energy is detected over the wireless communication channel. For example, controller 124 may (FIG. 1) may activate detector component 144 (FIG. 1), for example, when energy is detected by detector component 142 (FIG. 1), e.g., as described above.

As indicated at block 308, the method may include determining whether the energy is a signal, e.g., not noise. For example, detector component 144 (FIG. 1) may determine whether the detected energy is a signal, e.g., as described above.

As indicated at block 310, the method may include tracking a duration of the detected signal and storing radar detection information. For example, detector component 144 (FIG. 1) may track the duration of the signal and/or store radar detection information in memory 146 (FIG. 1), e.g., as described above.

As indicated at block 312, the method may include determining whether or not duration of the signal is greater than a predefined lower limit duration, e.g., of 20 microseconds (us). For example, detector component 144 (FIG. 1) may determine whether or not the duration of the signal is greater than 20 us.

As indicated at block 314, the method may include determining whether or not the duration of the signal is less than a predefined upper limit duration, e.g., of 100 us. For example, detector component 144 (FIG. 1) may determine whether or not the duration of the signal is less than 100 us.

As indicated at block 316, the method may include activating a classifier to classify the signal as a radar type or a non-radar type, e.g., if the duration of the signal is between the upper and the lower duration limits. For example, controller 124 (FIG. 1) may activate signal classifier 145 (FIG. 1), for example, based on the duration of the signal, e.g., as described above.

As indicated at block 318, the method may include classifying the signal as a radar type or a non-radar type. For example, signal classifier 145 (FIG. 1) may classify the signal as a radar type or non-radar type, e.g., as described above.

As indicated at block 320, the method may include storing a detection event in a database, for example, if the signal is classified as a radar type and/or if the detected energy is not between the upper and lower duration limits. For example, controller 124 (FIG. 1) may store the radar detection information corresponding to the detected signal in memory 146 (FIG. 1), e.g., as described above.

Figure 4:
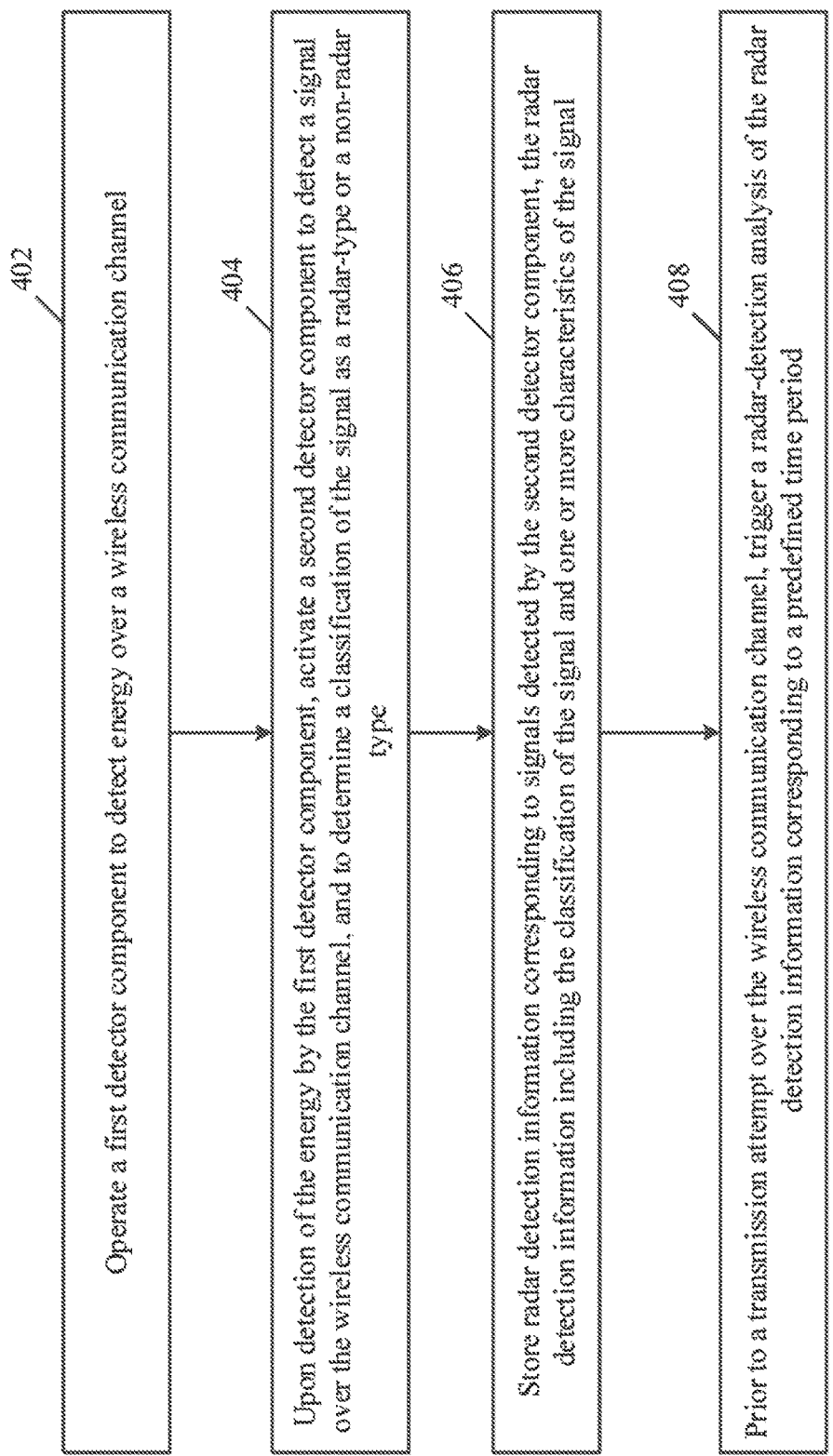
FIG. 4 is a schematic flow-chart illustration of a method of radar detection, in accordance with some demonstrative embodiments.

Reference is made to FIG. 4, which schematically illustrates a method of radar detection, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1); a radar detection module, e.g., radar detection module 140 (FIG. 1); a controller, e.g., controller 124 (FIG. 1); a detector component, e.g., detector components 142 and/or 144 (FIG. 1); and/or a radar analysis module, e.g., radar analysis module 148 (FIG. 1).

As indicated at block 402, the method may include operating a first detector component to detect energy over a wireless communication channel. For example, controller 124 (FIG. 1) may operate detector component 142 (FIG. 1), for example, to detect energy over the wireless communication channel, e.g., as described above.

As indicated at block 404, the method may include upon detection of the energy by the first detector component, activating a second detector component to detect a signal over the wireless communication channel, and to determine a classification of the signal as a radar-type or a non-radar type. For example, controller 124 (FIG. 1) may activate detector component 144 (FIG. 1), for example, to detect the signal over the wireless communication channel, and to determine the classification of the signal, for example, upon detection of the energy by detector component 142 (FIG. 1), e.g., as described above.

As indicated at block 406, the method may include storing radar detection information corresponding to signals detected by the second detector component, the radar detection information including the classification of the signal and one or more characteristics of the signal. For example, controller 124 (FIG. 1) and/or detector component 144 (FIG. 1) may store the radar detection information corresponding to the detected signal in memory 146 (FIG. 1), e.g., as described above.

As indicated at block 408, the method may include, prior to a transmission attempt over the wireless communication channel, triggering a radar-detection analysis of the radar detection information corresponding to a predefined time period. For example, controller 124 (FIG. 1) may trigger radar analysis module 148 (FIG. 1) to perform the radar-detection analysis of the radar detection information corresponding to the predefined time period, e.g., as described above.

Figure 5:
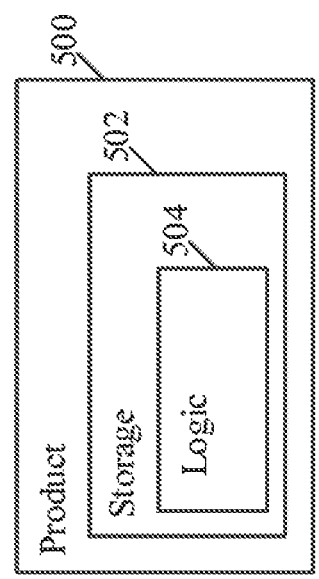
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at device 102 (FIG. 1), radio 114 (FIG. 1), radar detection module 140 (FIG. 1), controller 124 (FIG. 1), detector components 142 and/or 144 (FIG. 1), and/or radar analysis module 148 (FIG. 1), and/or to perform one or more operations described above with respect to FIGS. 1, 2, 3, and/or 4, and/or one or more operations described herein.

The phrase "non-transitory machine-readable medium" is directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a first detector component to detect energy over a wireless communication channel; a second detector component to detect a signal over the wireless communication channel, and to determine at least a classification of the signal as a radar-type or a non-radar type; a storage component to store radar detection information corresponding to signals detected by the second detector component, the radar detection information comprising at least the classification of the signal and one or more characteristics of the signal; and a controller to activate the second detector component upon detection of the energy by the first detector component, the controller configured to cause a radar-detection analysis of the radar detection information corresponding to a predefined time period.

Example 2 includes the subject matter of Example 1, and optionally, wherein the controller is to cause the radar detection analysis prior to a transmission attempt over the wireless communication channel.

Example 3 includes the subject matter of Example 2, and optionally, wherein the controller is to select whether or not to allow the transmission attempt over the wireless communication channel based on the radar-detection analysis.

Example 4 includes the subject matter of any one of Examples 1-3, and optionally, wherein the controller is to operate the first and second detector components during at least a low power mode of a wireless device, the controller to trigger the radar-detection analysis at an active power mode of the wireless device.

Example 5 includes the subject matter of any one of Examples 1-4, and optionally, comprising a phase locked loop (PLL) shared by the first and second detector components, the controller configured to change a frequency of the PLL, and to lock the frequency of the PLL upon detection of the energy by the first detector component.

Example 6 includes the subject matter of any one of Examples 1-5, and optionally, wherein the one or more characteristics of the signal comprise at least one of a duration of the signal, or a power of the signal.

Example 7 includes the subject matter of any one of Examples 1-6, and optionally, wherein the second detector component is to activate a signal classifier to determine the classification of the signal, based at least on a detected duration of the signal.

Example 8 includes the subject matter of any one of Examples 1-7, and optionally, wherein the first detector component comprises at least an In-phase only (I-only) mixer, an analog baseband filter, an envelope detector, an Analog to Digital Converter (ADC), and one or more digital power detectors.

Example 9 includes the subject matter of any one of Examples 1-8, and optionally, wherein the second detector component comprises at least an In-phase only (I-only) mixer, an analog baseband filter, an Analog to Digital Converter (ADC), a digital filter, a plurality of digital power detectors, and a chirp detector.

Example 10 includes the subject matter of any one of Examples 1-9, and optionally, wherein the predefined time period comprises a time period of one minute.

Example 11 includes the subject matter of any one of Examples 1-10, and optionally, wherein the wireless communication channel comprises a Dynamic Frequency Selection (DFS) channel.

Example 12 includes the subject matter of any one of Examples 1-11, and optionally, wherein the wireless communication channel comprises a channel in a 5 Gigahertz frequency band.

Example 13 includes the subject matter of any one of Examples 1-12, and optionally, comprising a transmitter to transmit over the wireless communication channel.

Example 14 includes the subject matter of any one of Examples 1-13, and optionally, comprising one or more antennas, and a processor.

Example 15 includes a wireless communication device comprising one or more antennas; a transmitter to transmit over a wireless communication frequency band; a first detector component to detect energy over a wireless communication channel in the wireless communication frequency band; a second detector component to detect a signal over the wireless communication channel, and to determine at least a classification of the signal as a radar-type or a non-radar type; a storage component to store radar detection information corresponding to signals detected by the second detector component, the radar detection information comprising at least the classification of the signal and one or more characteristics of the signal; and a controller to activate the second detector component upon detection of the energy by the first detector component, the controller configured to cause a radar-detection analysis of the radar detection information corresponding to a predefined time period.

Example 16 includes the subject matter of Example 15, and optionally, wherein the controller is to cause the radar detection analysis prior to a transmission attempt over the wireless communication channel.

Example 17 includes the subject matter of Example 16, and optionally, wherein the controller is to select whether or not to allow the transmission attempt over the wireless communication channel based on the radar-detection analysis.

Example 18 includes the subject matter of any one of Examples 15-17, and optionally, wherein the controller is to operate the first and second detector components during at least a low power mode of the wireless communication device, the controller to trigger the radar-detection analysis at an active power mode of the wireless communication device.

Example 19 includes the subject matter of any one of Examples 15-18, and optionally, comprising a phase locked loop (PLL) shared by the first and second detector components, the controller configured to change a frequency of the PLL, and to lock the frequency of the PLL upon detection of the energy by the first detector component.

Example 20 includes the subject matter of any one of Examples 15-19, and optionally, wherein the one or more characteristics of the signal comprise at least one of a duration of the signal, or a power of the signal.

Example 21 includes the subject matter of any one of Examples 15-20, and optionally, wherein the second detector component is to activate a signal classifier to determine the classification of the signal, based at least on a detected duration of the signal.

Example 22 includes the subject matter of any one of Examples 15-21, and optionally, wherein the first detector component comprises at least an In-phase only (I-only) mixer, an analog baseband filter, an envelope detector, an Analog to Digital Converter (ADC), and one or more digital power detectors.

Example 23 includes the subject matter of any one of Examples 15-22, and optionally, wherein the second detector component comprises at least an In-phase only (I-only) mixer, an analog baseband filter, an Analog to Digital Converter (ADC), a digital filter, a plurality of digital power detectors, and a chirp detector.

Example 24 includes the subject matter of any one of Examples 15-23, and optionally, wherein the predefined time period comprises a time period of one minute.

Example 25 includes the subject matter of any one of Examples 15-24, and optionally, wherein the wireless communication channel comprises a Dynamic Frequency Selection (DFS) channel.

Example 26 includes the subject matter of any one of Examples 15-25, and optionally, wherein the wireless communication channel comprises a channel in a 5 Gigahertz frequency band.

Example 27 includes a method to be performed at a wireless communication device, the method comprising operating a first detector component to detect energy over a wireless communication channel; upon detection of the energy by the first detector component, activating a second detector component to detect a signal over the wireless communication channel, and to determine a classification of the signal as a radar-type or a non-radar type; storing radar detection information corresponding to signals detected by the second detector component, the radar detection information comprising the classification of the signal and one or more characteristics of the signal; and causing a radar-detection analysis of the radar detection information corresponding to a predefined time period.

Example 28 includes the subject matter of Example 27, and optionally, comprising causing the radar detection analysis prior to a transmission attempt over the wireless communication channel.

Example 29 includes the subject matter of Example 28, and optionally, comprising selecting whether or not to allow the transmission attempt over the wireless communication channel based on the radar-detection analysis.

Example 30 includes the subject matter of any one of Examples 27-29, and optionally, comprising operating the first and second detector components during at least a low power mode of the wireless communication device, and triggering the radar-detection analysis at an active power mode of the wireless communication device.

Example 31 includes the subject matter of any one of Examples 27-30, and optionally, comprising changing a frequency of a phase locked loop (PLL), and locking the frequency of the PLL upon detection of the energy by the first detector component.

Example 32 includes the subject matter of any one of Examples 27-31, and optionally, wherein the one or more characteristics of the signal comprise at least one of a duration of the signal, or a power of the signal.

Example 33 includes the subject matter of any one of Examples 27-32, and optionally, comprising activating a signal classifier to determine the classification of the signal, based at least on a detected duration of the signal.

Example 34 includes the subject matter of any one of Examples 27-33, and optionally, wherein the first detector component comprises at least an In-phase only (I-only) mixer, an analog baseband filter, an envelope detector, an Analog to Digital Converter (ADC), and one or more digital power detectors.

Example 35 includes the subject matter of any one of Examples 27-34, and optionally, wherein the second detector component comprises at least an In-phase only (I-only) mixer, an analog baseband filter, an Analog to Digital Converter (ADC), a digital filter, a plurality of digital power detectors, and a chirp detector.

Example 36 includes the subject matter of any one of Examples 27-35, and optionally, wherein the predefined time period comprises a time period of one minute.

Example 37 includes the subject matter of any one of Examples 27-36, and optionally, wherein the wireless communication channel comprises a Dynamic Frequency Selection (DFS) channel.

Example 38 includes the subject matter of any one of Examples 27-37, and optionally, wherein the wireless communication channel comprises a channel in a 5 Gigahertz frequency band.

Example 39 includes a product comprising one or more tangible computer-readable non-transitory storage media comprising computer-executable instructions operable to, when executed by at least one computer processor, enable the at least one computer processor to implement operations at a wireless communication device, the operations comprising operating a first detector component to detect energy over a wireless communication channel; upon detection of the energy by the first detector component, activating a second detector component to detect a signal over the wireless communication channel, and to determine a classification of the signal as a radar-type or a non-radar type; storing radar detection information corresponding to signals detected by the second detector component, the radar detection information comprising the classification of the signal and one or more characteristics of the signal; and causing a radar-detection analysis of the radar detection information corresponding to a predefined time period.

Example 40 includes the subject matter of Example 39, and optionally, wherein the operations comprise causing the radar detection analysis prior to a transmission attempt over the wireless communication channel.

Example 41 includes the subject matter of Example 40, and optionally, wherein the operations comprise selecting whether or not to allow the transmission attempt over the wireless communication channel based on the radar-detection analysis.

Example 42 includes the subject matter of any one of Examples 39-41, and optionally, wherein the operations comprise operating the first and second detector components during at least a low power mode of the wireless communication device, and triggering the radar-detection analysis at an active power mode of the wireless communication device.

Example 43 includes the subject matter of any one of Examples 39-42, and optionally, wherein the operations comprise changing a frequency of a phase locked loop (PLL), and locking the frequency of the PLL upon detection of the energy by the first detector component.

Example 44 includes the subject matter of any one of Examples 39-43, and optionally, wherein the one or more characteristics of the signal comprise at least one of a duration of the signal, or a power of the signal.

Example 45 includes the subject matter of any one of Examples 39-44, and optionally, wherein the operations comprise activating a signal classifier to determine the classification of the signal, based at least on a detected duration of the signal.

Example 46 includes the subject matter of any one of Examples 39-45, and optionally, wherein the first detector component comprises at least an In-phase only (I-only) mixer, an analog baseband filter, an envelope detector, an Analog to Digital Converter (ADC), and one or more digital power detectors.

Example 47 includes the subject matter of any one of Examples 39-46, and optionally, wherein the second detector component comprises at least an In-phase only (I-only) mixer, an analog baseband filter, an Analog to Digital Converter (ADC), a digital filter, a plurality of digital power detectors, and a chirp detector.

Example 48 includes the subject matter of any one of Examples 39-47, and optionally, wherein the predefined time period comprises a time period of one minute.

Example 49 includes the subject matter of any one of Examples 39-48, and optionally, wherein the wireless communication channel comprises a Dynamic Frequency Selection (DFS) channel.

Example 50 includes the subject matter of any one of Examples 39-49, and optionally, wherein the wireless communication channel comprises a channel in a 5 Gigahertz frequency band.

Example 51 includes an apparatus comprising means for operating a first detector component to detect energy over a wireless communication channel; means for, upon detection of the energy by the first detector component, activating a second detector component to detect a signal over the wireless communication channel, and to determine a classification of the signal as a radar-type or a non-radar type; means for storing radar detection information corresponding to signals detected by the second detector component, the radar detection information comprising the classification of the signal and one or more characteristics of the signal; and means for causing a radar-detection analysis of the radar detection information corresponding to a predefined time period.

Example 52 includes the subject matter of Example 51, and optionally, comprising means for causing the radar detection analysis prior to a transmission attempt over the wireless communication channel.

Example 53 includes the subject matter of Example 52, and optionally, comprising means for selecting whether or not to allow the transmission attempt over the wireless communication channel based on the radar-detection analysis.

Example 54 includes the subject matter of any one of Examples 51-53, and optionally, comprising means for operating the first and second detector components during at least a low power mode of a wireless communication device, and triggering the radar-detection analysis at an active power mode of the wireless communication device.

Example 55 includes the subject matter of any one of Examples 51-54, and optionally, comprising means for changing a frequency of a phase locked loop (PLL), and locking the frequency of the PLL upon detection of the energy by the first detector component.

Example 56 includes the subject matter of any one of Examples 51-55, and optionally, wherein the one or more characteristics of the signal comprise at least one of a duration of the signal, or a power of the signal.

Example 57 includes the subject matter of any one of Examples 51-56, and optionally, comprising means for activating a signal classifier to determine the classification of the signal, based at least on a detected duration of the signal.

Example 58 includes the subject matter of any one of Examples 51-57, and optionally, wherein the first detector component comprises at least an In-phase only (I-only) mixer, an analog baseband filter, an envelope detector, an Analog to Digital Converter (ADC), and one or more digital power detectors.

Example 59 includes the subject matter of any one of Examples 51-58, and optionally, wherein the second detector component comprises at least an In-phase only (I-only) mixer, an analog baseband filter, an Analog to Digital Converter (ADC), a digital filter, a plurality of digital power detectors, and a chirp detector.

Example 60 includes the subject matter of any one of Examples 51-59, and optionally, wherein the predefined time period comprises a time period of one minute.

Example 61 includes the subject matter of any one of Examples 51-60, and optionally, wherein the wireless communication channel comprises a Dynamic Frequency Selection (DFS) channel.

Example 62 includes the subject matter of any one of Examples 51-61, and optionally, wherein the wireless communication channel comprises a channel in a 5 Gigahertz frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a first detector to detect energy over a wireless communication channel;
   a second detector to detect a signal over the wireless communication channel, and to determine at least a classification of the signal as a radar-type or a non-radar type;
   a phase locked loop (PLL) shared by the first and second detectors;
   a storage to store radar detection information corresponding to signals detected by the second detector over said wireless communication channel, the radar detection information comprising at least the classification of the signal determined by the second detector and one or more characteristics of the signal; and
   a controller configured to change a frequency of the PLL for detection of the energy by the first detector, and, in response to detection of the energy by the first detector, to lock the frequency of the PLL for detection of the signal by the second detector, and to activate the second detector to detect the signal and to determine the classification of the signal, the controller configured to, prior to a transmission attempt over the wireless communication channel, cause a radar-detection analysis of the radar detection information corresponding to a predefined time period, and select whether or not to allow the transmission attempt over the wireless communication channel based on the radar-detection analysis, the radar-detection analysis based at least on the classification of the signal determined by the second detector.

2. The apparatus of claim 1, wherein the controller is to operate the first and second detectors during at least a low power mode of a wireless device, the controller to trigger the radar-detection analysis at an active power mode of the wireless device.

3. The apparatus of claim 1, wherein the one or more characteristics of the signal comprise at least one of a duration of the signal, or a power of the signal.

4. The apparatus of claim 1, wherein the second detector is to activate a signal classifier to determine the classification of the signal, based at least on a detected duration of the signal.

5. The apparatus of claim 1, wherein the first detector comprises at least an In-phase only (I-only) mixer, an analog baseband filter, an envelope detector, an Analog to Digital Converter (ADC), and one or more digital power detectors.

6. The apparatus of claim 1, wherein the second detector comprises at least an In-phase only (I-only) mixer, an analog baseband filter, an Analog to Digital Converter (ADC), a digital filter, a plurality of digital power detectors, and a chirp detector.

7. The apparatus of claim 1, wherein the predefined time period comprises a time period of one minute.

8. The apparatus of claim 1, wherein the wireless communication channel comprises a Dynamic Frequency Selection (DFS) channel.

9. The apparatus of claim 1, wherein the wireless communication channel comprises a channel in a 5 Gigahertz frequency band.

10. The apparatus of claim 1 comprising a transmitter to transmit over the wireless communication channel.

11. The apparatus of claim 1 comprising one or more antennas, and a processor.

12. A wireless communication device comprising:
one or more antennas;
a transmitter to transmit over a wireless communication frequency band;
a first detector to detect energy over a wireless communication channel in the wireless communication frequency band;
a second detector to detect a signal over the wireless communication channel, and to determine at least a classification of the signal as a radar-type or a non-radar type;
a phase locked loop (PLL) shared by the first and second detectors;
a storage to store radar detection information corresponding to signals detected by the second detector over said wireless communication channel, the radar detection information comprising at least the classification of the signal determined by the second detector and one or more characteristics of the signal; and
a controller configured to change a frequency of the PLL for detection of the energy by the first detector, and, in response to detection of the energy by the first detector, to lock the frequency of the PLL for detection of the signal by the second detector, and to activate the second detector to detect the signal and to determine the classification of the signal, the controller configured to cause a radar-detection analysis of the radar detection information corresponding to a predefined time period, the radar-detection analysis based at least on the classification of the signal determined by the second detector, wherein the controller is to operate the first and second detectors during at least a low power mode of the wireless communication device, and to trigger the radar-detection analysis at an active power mode of the wireless communication device.

13. The wireless communication device of claim 12, wherein the controller is to cause the radar-detection analysis prior to a transmission attempt over the wireless communication channel.

14. The wireless communication device of claim 13, wherein the controller is to select whether or not to allow the transmission attempt over the wireless communication channel based on the radar-detection analysis.

15. The wireless communication device of claim 12, wherein the second detector is to activate a signal classifier to determine the classification of the signal, based at least on a detected duration of the signal.

16. The wireless communication device of claim 12, wherein the one or more characteristics of the signal comprise at least one of a duration of the signal, or a power of the signal.

17. A method to be performed at a wireless communication device, the method comprising:
operating a first detector to detect energy over a wireless communication channel by changing a frequency of a phase locked loop (PLL) shared by the first detector and a second detector;
in response to detection of the energy by the first detector, locking the frequency of the PLL for signal detection by the second detector, and activating the second detector to detect a signal over the wireless communication channel, and to determine a classification of the signal as a radar-type or a non-radar type;
storing radar detection information corresponding to signals detected by the second detector over said wireless communication channel, the radar detection information comprising the classification of the signal determined by the second detector and one or more characteristics of the signal;
prior to a transmission attempt over the wireless communication channel, causing a radar-detection analysis of the radar detection information corresponding to a predefined time period based at least on the classification of the signal determined by the second detector; and
selecting whether or not to allow the transmission attempt over the wireless communication channel based on the radar-detection analysis.

18. The method of claim 17 comprising operating the first and second detector components during at least a low power mode of the wireless communication device, and triggering the radar-detection analysis at an active power mode of the wireless communication device.

19. A product comprising one or more tangible computer-readable non-transitory storage media comprising computer-executable instructions operable to, when executed by at least one processor, enable the at least one processor to cause a wireless communication device to:
operate a first detector to detect energy over a wireless communication channel by changing a frequency of a phase locked loop (PLL) shared by the first detector and a second detector;
in response to detection of the energy by the first detector, lock the frequency of the PLL for signal detection by the second detector, and activate the second detector to detect a signal over the wireless communication channel, and to determine a classification of the signal as a radar-type or a non-radar type;
store radar detection information corresponding to signals detected by the second detector over said wireless communication channel, the radar detection information comprising the classification of the signal determined by the second detector and one or more characteristics of the signal;
prior to a transmission attempt over the wireless communication channel, cause a radar-detection analysis of the radar detection information corresponding to a predefined time period based at least on the classification of the signal determined by the second detector; and
select whether or not to allow the transmission attempt over the wireless communication channel based on the radar-detection analysis.

20. The product of claim 19, wherein the one or more characteristics of the signal comprise at least one of a duration of the signal, or a power of the signal.

21. The product of claim 19, wherein the instructions, when executed, cause the wireless communication device to activate a signal classifier to determine the classification of the signal, based at least on a detected duration of the signal.

22. The product of claim 19, wherein the instructions, when executed, cause the wireless communication device to operate the first and second detectors during at least a low power mode of the wireless communication device, and trigger the radar-detection analysis at an active power mode of the wireless communication device.

\* \* \* \* \*